(12) United States Patent
Tsai

(10) Patent No.: US 7,843,097 B2
(45) Date of Patent: Nov. 30, 2010

(54) POWER TRANSMISSION APPARATUS

(75) Inventor: Ming-Chun Tsai, No. 88, Haodeng 1st St., Lujhu Township, Taoyuan County (TW) 338

(73) Assignee: Ming-Chun Tsai, Taoyuan County (TW)

( * ) Notice: Subject to any disclaimer, the term of this patent is extended or adjusted under 35 U.S.C. 154(b) by 0 days.

(21) Appl. No.: 12/572,278

(22) Filed: Oct. 2, 2009

(65) Prior Publication Data

US 2010/0019596 A1    Jan. 28, 2010

Related U.S. Application Data

(63) Continuation-in-part of application No. 11/675,056, filed on Feb. 14, 2007, now Pat. No. 7,755,238.

(30) Foreign Application Priority Data

Jan. 23, 2009    (CN) .................. 2009 1 0045440

(51) Int. Cl.
   *H02K 5/16* (2006.01)
(52) U.S. Cl. .................... 310/90; 310/113
(58) Field of Classification Search ............. 310/90, 310/113; 415/4.2, 4.3, 900; 290/43, 44, 290/54, 55
   See application file for complete search history.

(56) References Cited

U.S. PATENT DOCUMENTS

| 2,563,279 | A | * | 8/1951 | Rushing | 415/4.3 |
| 4,134,708 | A | * | 1/1979 | Brauser et al. | 415/30 |
| 4,218,175 | A | * | 8/1980 | Carpenter | 415/219.1 |
| 4,383,801 | A | * | 5/1983 | Pryor | 416/17 |
| 4,455,491 | A | * | 6/1984 | Lanzrath | 290/44 |
| 4,609,827 | A | * | 9/1986 | Nepple | 290/44 |
| 5,194,754 | A | * | 3/1993 | Mikami | 290/55 |
| 6,069,409 | A | * | 5/2000 | Fowler et al. | 290/55 |
| 7,255,527 | B2 | * | 8/2007 | Hsu | 415/4.3 |

* cited by examiner

*Primary Examiner*—Thanh-Tam T Le
(74) *Attorney, Agent, or Firm*—CKC & Partners Co., Ltd.

(57) ABSTRACT

Disclosed herein is a power transmission apparatus, which includes a top, a bearing holder, a driving member, a transmitting plate having at least one groove, and a rotating wheel having at least one roller. The top has a body and a spindle that penetrates the center of the body and is substantially vertical to the ground. The bearing holder locates on the ground and supports one end of the spindle. The driving member is used for rotating the top. The at least one roller is embedded in the at least one groove on the transmitting plate.

11 Claims, 5 Drawing Sheets

POWER TRANSMISSION APPARATUS

CROSS-REFERENCE

The present application is a continuation in part of my application Ser. No. 11/675,056, filed Feb. 14, 2007, and claims priority to China Application Ser. No. 200910045440.8, filed Jan. 23, 2009, which is herein incorporated by reference.

BACKGROUND

1. Technical Field

The present disclosure relates to a power generator. More particularly, the present disclosure relates to a power generator with a heavy top.

2. Description of Related Art

With the rapid growth in commercial/industrial activities and comfortable living needs in recent years there is a higher demand and dependency on electric power. Currently, electric power is generated mainly from nuclear power, coal, oil, gas, wind, ground heat, and solar energy.

The energy resources on the Earth are continuously exhausted. However, power consumption is increasing every day. Therefore, the environmental demands are increasing and environmental pollution is getting worse. In view of the limited energy resources on the Earth, it is imperative for scientists to find new substitute energy.

Currently, there are pros and cons for nuclear power usage; its further development, in particular, has caused a long-term debate. As to waterpower, most of the water resources have been utilized and the impact of waterpower to nature is always criticized; its future is also very limited. In addition, the environmental pollution and greenhouse effect due to burning coals are not yet solved, either.

Facing foreseeable energy shortages in the future and under the condition of being unable to find new substitute energy, it is of consequence to use any method and mechanism to generate the power to reduce the energy crisis impact for humans.

SUMMARY

According to one embodiment of the present disclosure, the power transmission apparatus includes a top, a bearing holder, a driving member, a transmitting plate having at least one groove, and a rotating wheel having at least one roller. The bearing holder locates on the ground and supports the top. The driving member is used for rotating the top. The transmitting plate having at least one groove couples to the top. The at least one roller engages with the at least one groove on the transmitting plate.

It is to be understood that both the foregoing general description and the following detailed description are by examples, and are intended to provide further explanation of the invention as claimed.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

Figure 1:
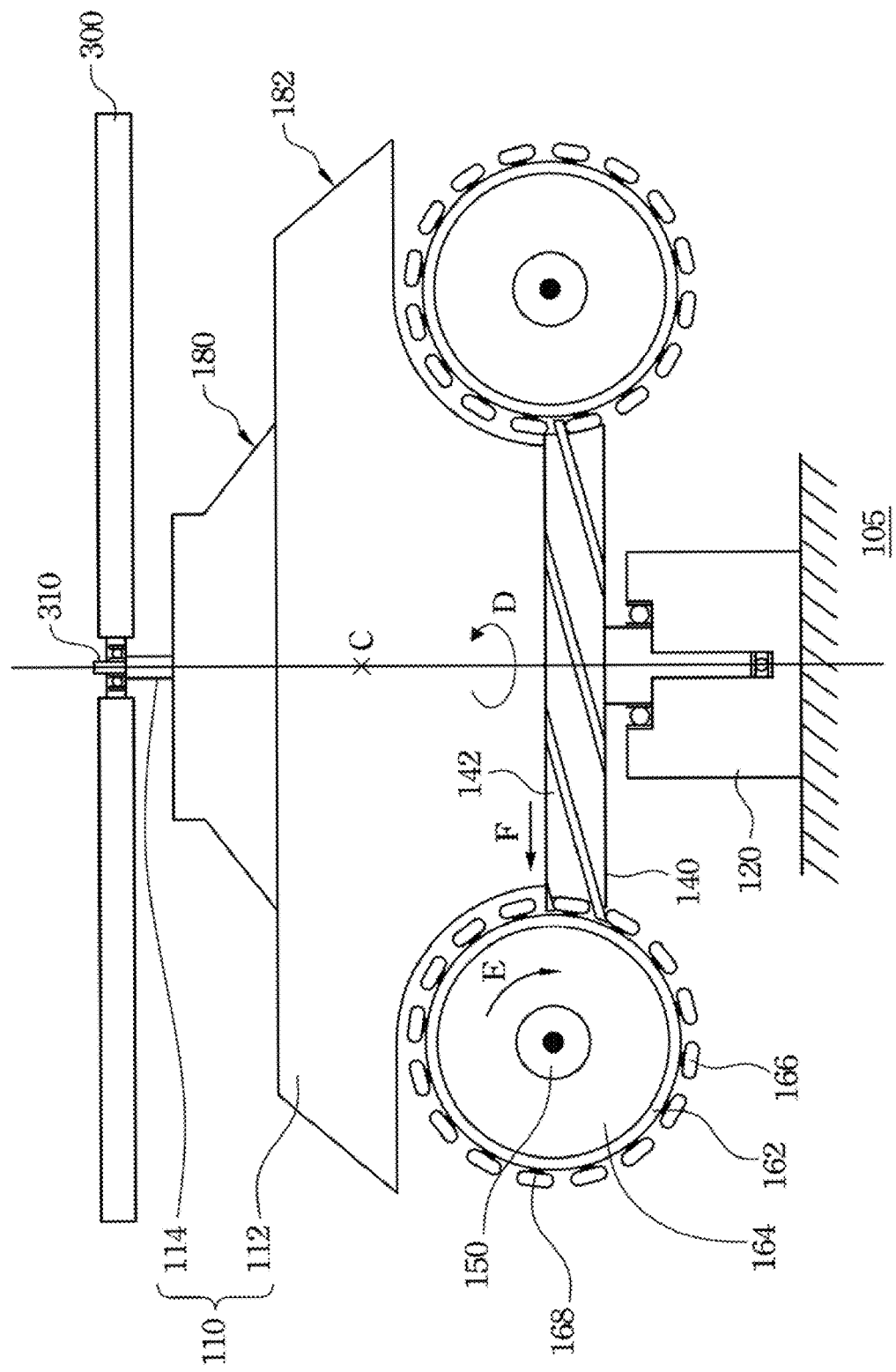
FIG. 1 is a schematic cross-sectional view of a power transmission apparatus according to one embodiment of the present disclosure.
Figure 2:
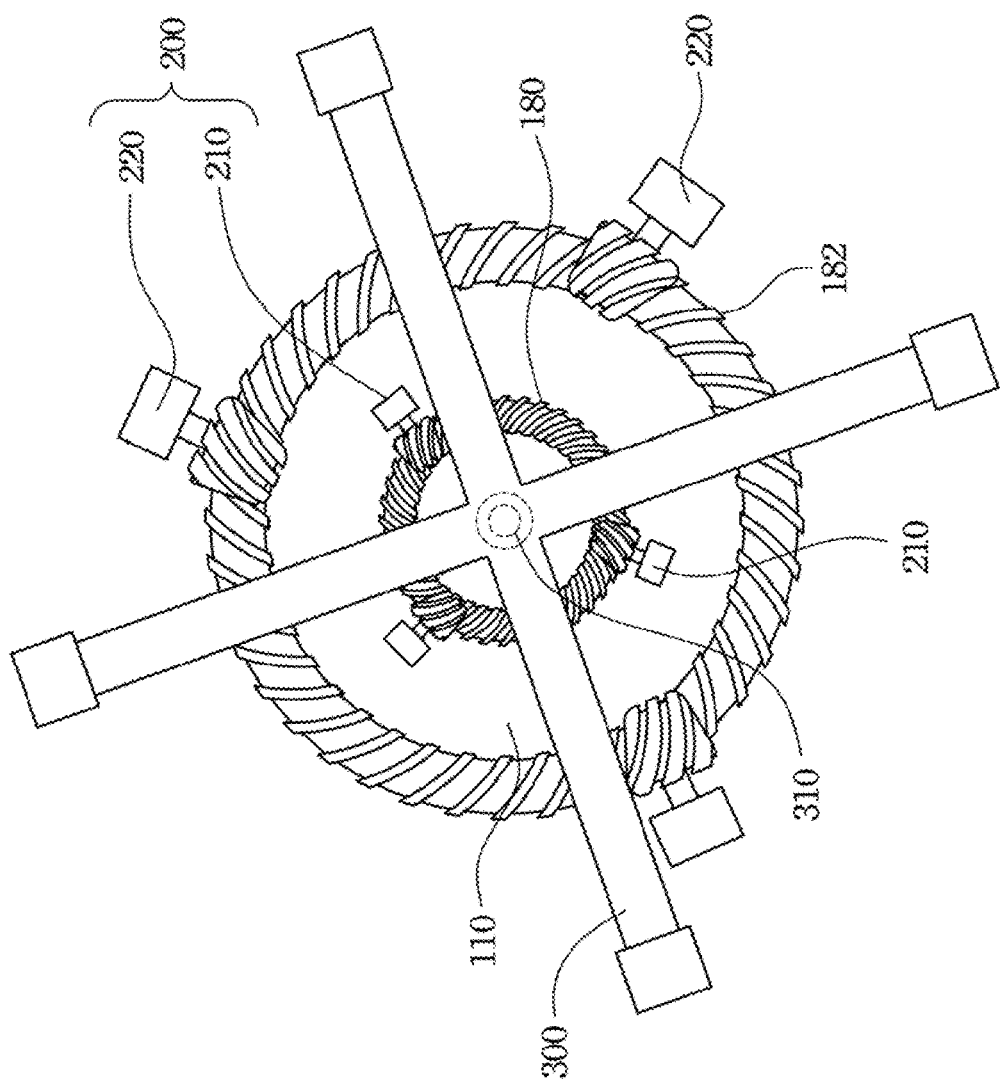
FIG. 2 is a top view of the power transmission apparatus of FIG. 1.

FIG. 1 is a schematic cross-sectional view of a power transmission apparatus according to one embodiment of the present disclosure. FIG. 2 is a top view of the power transmission apparatus of FIG. 1. The power transmission apparatus includes a top 110, a bearing holder 120, a driving member 200, a transmitting plate 140 and a rotating wheel 164.

The top 110 includes a body 112 and a spindle 114. In one embodiment, there are also a first gear 180 and a second gear 182 disposed on the body 112 of the top 110. Both the first and the second gears 180, 182 surround the spindle 114, and the second gear 182 is arranged out of the first gear 180, i.e. the second gear 182 has a larger diameter than that of the first gear 180. The spindle 114 of the top 110 penetrates through the body 112, and is substantially vertical to the ground 105.

The bottom side of the spindle 114 of the top 110 inserts into the bearing holder 120. Thus, the bearing holder 120 may support the top 110, and the top 110 is operable to rotate on axis of the spindle 114. In addition, a holding frame 300 is disposed above the top 110, and the holding frame 300 has a bearing 310 on the center thereof. The top side of the spindle 114 is disposed in the bearing 310. Therefore, the top 110 may stably rotate and is prevented from the risk of inclination.

In one embodiment, the top 110 may be made of a material having high density such as lead (Pb) and thus has a large mass. Initially, a large amount of energy is required to drive the top 110 to rotate. However, after the top 110 rotates stably, the required energy to maintain the rotation of the top 110 considerably decreases.

Referring to FIG. 2, the driving member 200 is operable to drive the top 110 to rotate. In one embodiment, the driving member 200 includes three first motors 210 coupled to the first gear 180 and three second motors 220 coupled to the second gear 182. The first and second motors 210, 220 are arranged symmetrically or uniformly relative to the spindle 114. Therefore, the first and second motors 210, 220 may stably drive the top 110 to rotate. The forces provided by the first motors 210 are substantially the same, and the forces provided by the second motors 220 are substantially the same as well. During the initial period of starting the top 110 to rotate, the driving member 200 must supply a larger driving force to make the top 110 into a condition of a satisfactory rotation. In this period, the second motors 220 coupled to the second gear 182 may be used to start the rotary movement of the top 110, and thus the required driving force may decrease. After the rotation of the top 110 reaches a certain speed, the first motors 210 may be used to maintain the rotation of the top 110 if necessary.

Figure 3:
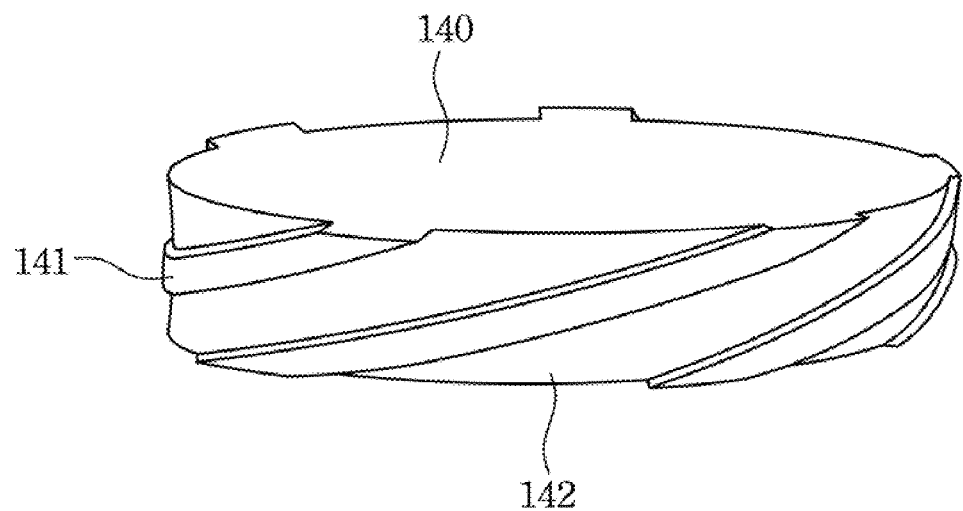
FIG. 3 is a perspective view of the transmitting plate of FIG. 1.

The transmitting plate 140 of FIG. 1 is disposed on the bottom half of the top 110 which may rotate along with the top 110. In one embodiment, the direction and speed of the rotation of the transmitting plate 140 is the same as these of the top 110. In another embodiment, a plurality of grooves 142 may be formed on the side surface 141 of the transmitting plate 140, as shown in FIG. 3. The transmitting plate 140 may drive the rotating wheel 164 into rotating by the grooves 142 on the transmitting plate 140, and the detail mechanical design is described in the following.

According to one embodiment of the present disclosure, a plurality of rollers 166 may be disposed on the border frame 162 of the rotating wheel 164, as shown in FIG. 1, and the rollers 166 may engage with the grooves 142. For example, the roller 166 may be a rolling disk and be fastened on the border frame 162 by a holding nail 168; however, the roller 166 may freely revolve on the axis of the holding nail 168. Moreover, the position of each of the rollers 166 is corresponding to the arrangement of the grooves 142 formed on the transmitting plate 140, and each of the rollers 166 may be sequentially embedded in a corresponding groove 142 on the transmitting plate 140. The dimension of the groove 142 matches the size of the roller 162, and the distance between two adjacent rollers also matches that between two adjacent grooves 142. While the top 110 drives the transmitting plate 140 into rotary movement, the groove 142 also drives the roller 166 to move and to revolve, and thus the rotating wheel 164 may revolve on the axis thereof. For example, while the transmitting plate 140 rotates in the direction of arrow D in FIG. 1, the rollers 166 will one by one enter into the corresponding grooves 142 in sequence. Simultaneously, the groove 142 will push the roller 166 embedded in the groove 142 to move downward and revolve at the same time. While the roller 166 moves downward, the rotating wheel 164 also rotates in the direction of arrow E. By the above-mentioned design, the mechanical energy of the rotary movement of the top 110 may be transmitted to the rotating wheel 164 through the transmitting plate 140.

Figure 4:
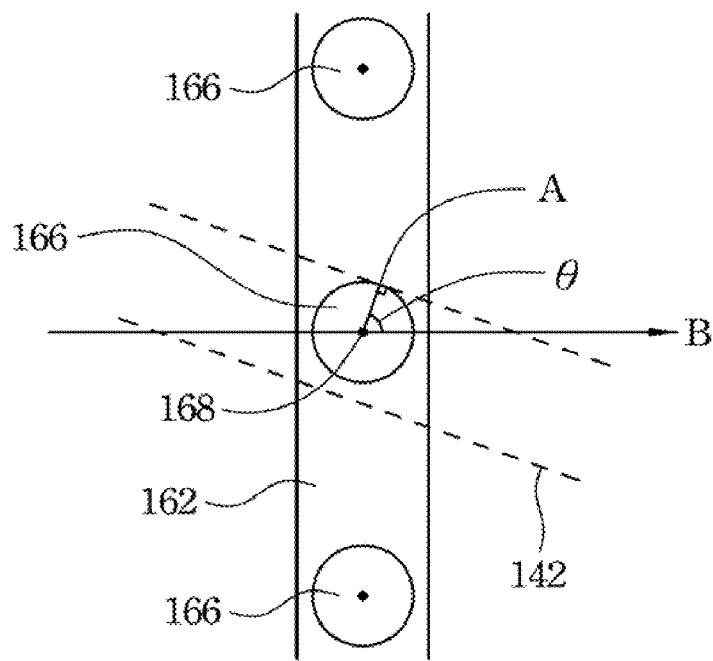
FIG. 4 is a plane view taken along the arrow F of FIG. 1.

FIG. 4 is a plane view taken along the arrow F of FIG. 1. As shown in FIG. 4, a roller 166 is embedded in a groove 142 of the transmitting plate 140, and the roller 166 contacts the edge of the groove at the contact point A. An angle θ is formed between the axel B of the rotating wheel 164 and a line connecting the center of the roller 166 and the contact point A. In one embodiment, the angle θ is greater than or equal to 45 degrees, and less than 90 degrees. While the angle θ is less than 45 degrees, the energy loss of driving the roller 166 to move considerably becomes large. While the angle θ equals 90 degrees, the groove 142 cannot drive the rotating wheel 164 into rotary movement. Therefore, the angle θ which is greater than or equal to 45 degrees and less than 90 degree is more suitable in application. However, the present disclosure is not limited on the above-mentioned range of the angle θ.

The power transmission apparatus as described above may further include an energy transformation device 150 coupled to the rotating wheel 164. In one embodiment, the energy transformation device may be an electrical generator, which generates electrical energy by transforming the mechanical energy of the rotating wheel 164 into electrical energy. In other words, the mechanical energy of the rotary movement of the top 110 is transmitted to the rotating wheel 164 through the transmitting plate 140, and then the mechanical energy is further transmitted to the energy transformation device 150, which converts the mechanical energy into electrical energy. In another embodiment, the energy transformation device 150 may be a machinery of a conveyor, and may be driven by the rotating wheel 164.

In one embodiment, the top 110 is disposed above the transmitting plate 140 for the purpose of transmitting other mechanical force from the environment to the top 110, and thus the center of gravity C of the top 110 is located above the transmitting plate, as shown in FIG. 1.

Figure 5:
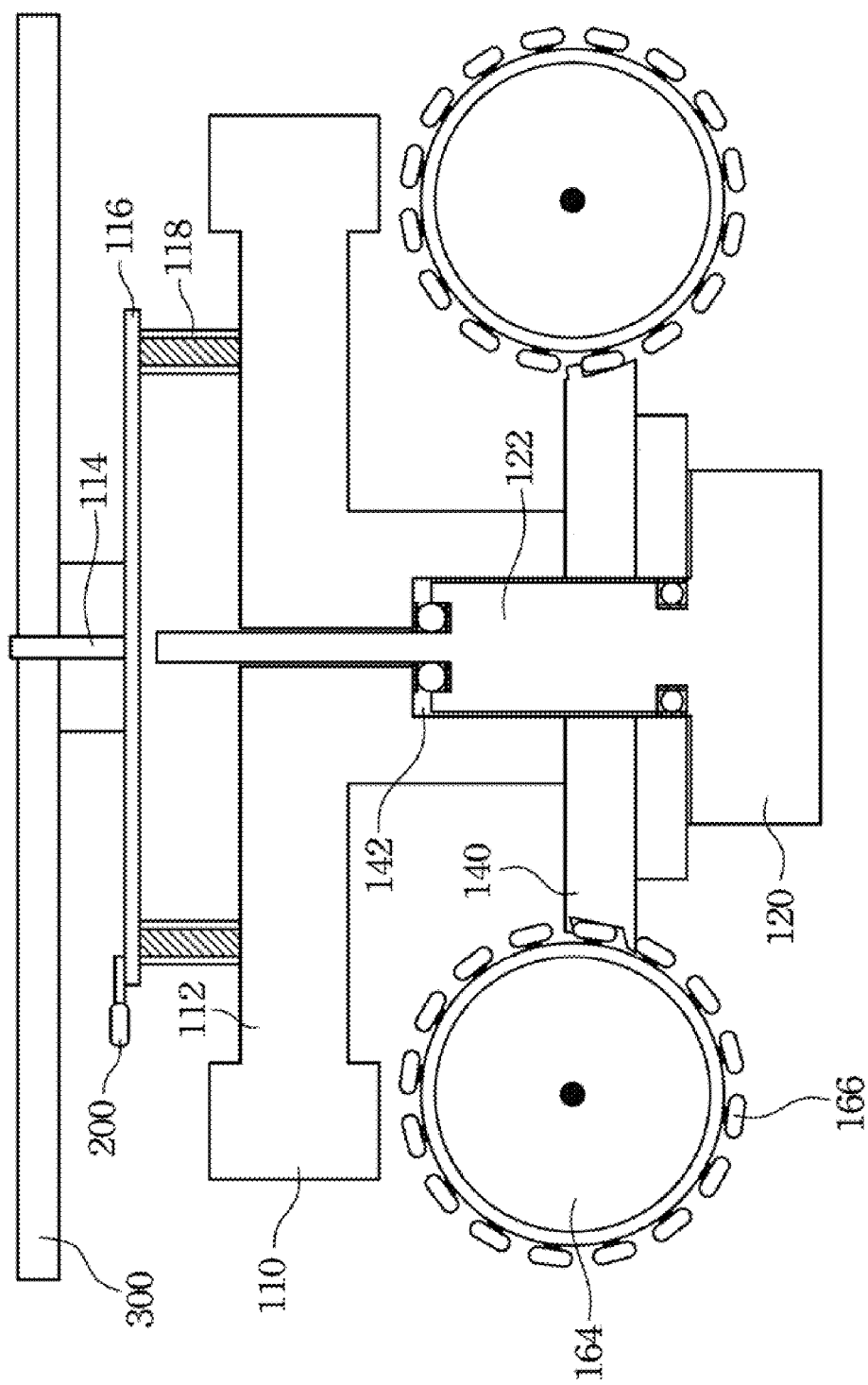
FIG. 5 is a schematic cross-sectional view of a power transmission apparatus according to another embodiment of the present disclosure.

FIG. 5 is a schematic cross-sectional view of a power transmission apparatus according to another embodiment of the present disclosure. The power transmission apparatus includes a top 110, a bearing holder 120, a transmitting plate 140, a rotating wheel 164, and a driving member 200. In this embodiment, the top 110 has a body 112, a spindle 114, a mounting disk 116, and a connecting ring 118. The driving member 200 is coupled to the mounting disk 116 which is mechanically coupled to the body 112 of the top 110 through the connecting ring 118. Therefore, the top 110 may be driven by the driving member 200. In addition, a through hole 142 is formed in the body 112 of the top 110 and transmitting plate 140, while the bearing holder 120 has a protrusive portion 122 which extends into the through hole 142. The protrusive portion 122 of the bearing holder 120 may extend through the transmitting plate 140 and the body 112 of the top 110, and thus both the top 110 and the transmitting plate may rotate around the protrusive portion 122.

Figure 6:
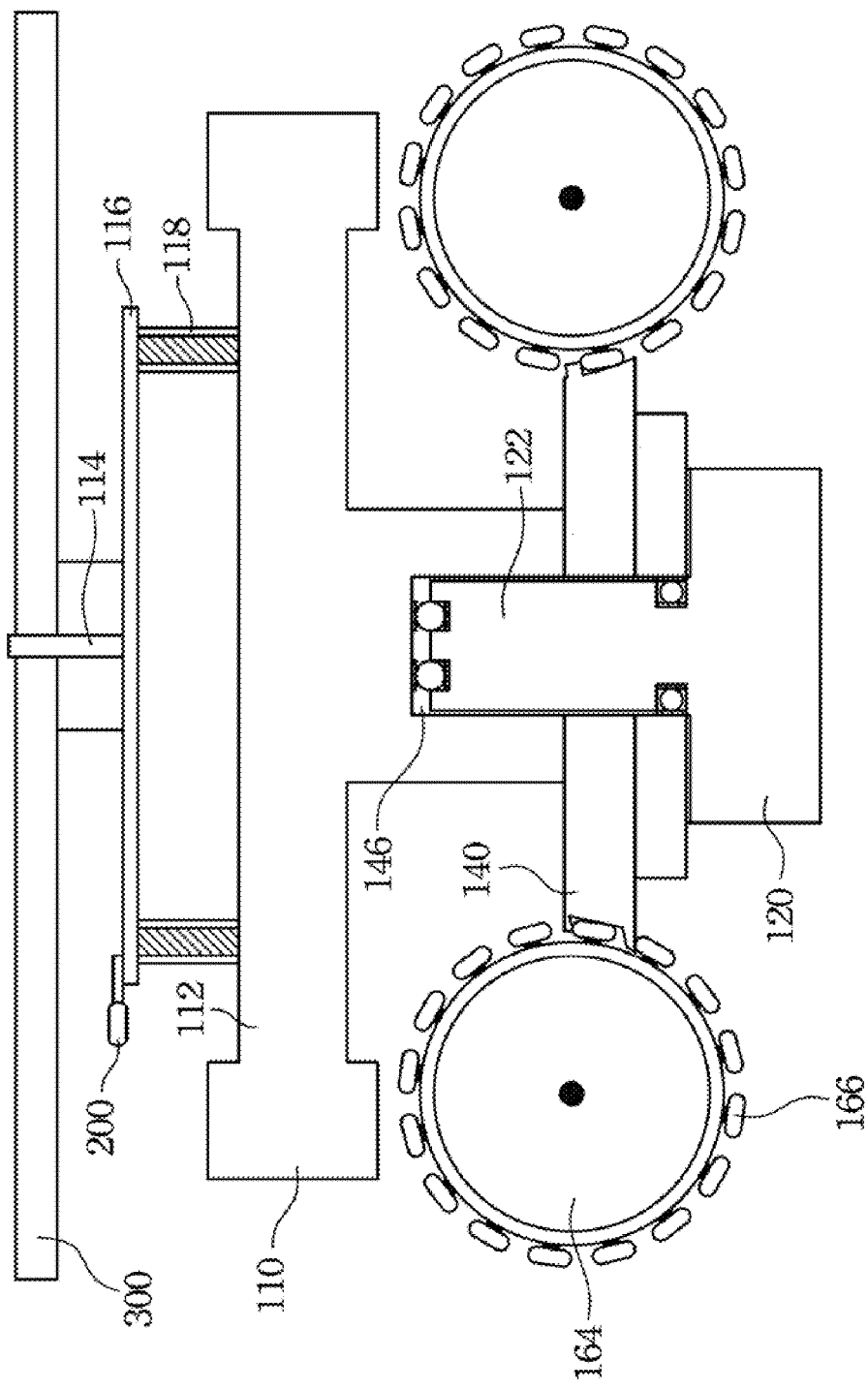
FIG. 6 is a schematic cross-sectional view of a power transmission apparatus according to yet another embodiment of the present disclosure.

FIG. 6 is a schematic cross-sectional view of a power transmission apparatus according to still another embodiment of the present disclosure. In this embodiment, the power transmission apparatus includes a top 110, a bearing holder 120, a transmitting plate 140, a rotating wheel 164, and a driving member 200. The top 110 has a body 112, a spindle 114, a mounting disk 116, and a connecting ring 118 as described hereinbefore. The bearing holder 120 has a protrusive portion 122, and the bottom of the transmitting plate 140 has a recess 146 which matches the protrusive portion 122. The protrusive portion 122 extends into the recess 146, and thus both the top 110 and the transmitting plate may rotate around the protrusive portion 122.

In the present disclosure, a top is adopted for providing a stable mechanical energy, and then the mechanical energy is transmitted to an energy transformation device through a transmitting plate and a rotating wheel. All approaches in the energy transmission adopt rotary movement of machineries, and thereby the energy loss during the energy transmission may decrease. While the energy transformation device is an electrical generator according to one embodiment, the power transmission apparatus may provide stable electricity with high efficiency.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A power transmission apparatus comprising:
   a top;
   a bearing holder positioned on ground for supporting the top;
   a driving member for rotating the top;
   a transmitting plate coupled to the top and being rotatable simultaneously along with the top and the transmitting plate having at least one groove located thereon; and
   a rotating wheel having at least one roller located thereon, wherein the roller engages with the groove such that the transmitting plate drives the rotating wheel to revolve.

2. The power transmission apparatus according to claim 1, wherein the roller is a rolling disk, the rotating wheel has a frame border, and the rolling disk is disposed on the frame border of the rotating wheel.

3. The power transmission apparatus according to claim 2, wherein an angle between the axel of the rotating wheel and a line connecting the center of the rolling disk and a contact point between the rolling disk and the groove is greater than or equal to 45 degrees and less than 90 degrees.

4. The power transmission apparatus according to claim 1, wherein the groove is located on a side surface of the transmitting plate.

5. The power transmission apparatus according to claim 1, wherein the top further comprises:
   a first gear disposed on the body; and
   a second gear disposed on the body, wherein the first gear is surrounded by the second gear.

6. The power transmission apparatus according to claim 5, wherein the driving member comprises a plurality of first motors coupled to the first gear.

7. The power transmission apparatus according to claim 6, wherein the first motors are symmetrically arranged relative to the spindle.

8. The power transmission apparatus according to claim 5, wherein the driving member comprises a plurality of second motors coupled to the second gear.

9. The power transmission apparatus according to claim 8, wherein the second motors are symmetrically arranged relative to the spindle.

10. The power transmission apparatus according to claim 1, further comprising:
    an energy transformation device coupled to the rotating wheel, wherein the energy transformation device is an electrical generator or a conveyor.

11. The power transmission apparatus according to claim 1, wherein the top comprises a body and a spindle, and wherein the spindle penetrates the center of the body and is substantially vertical to the ground.

* * * * *